UNITED STATES PATENT OFFICE.

JOEL H. TATUM, OF BALTIMORE, MARYLAND.

PREPARATION OF OIL-GROUND TO RECEIVE PHOTOGRAPHIC IMPRESSIONS.

Specification forming part of Letters Patent No. 14,679, dated April 15, 1856; Reissue No. 368, dated May 13, 1856.

*To all whom it may concern:*

Be it known that I, JOEL HAYWOOD TATUM, of the city of Baltimore, and State of Maryland, have discovered or invented a new and useful preparation of oil ground or body and mode of preparing the same by which photographic impressions—such as portraits of all sizes, landscapes, or still life—may be produced upon such oil-prepared ground, body, or surface, whether upon canvas, mill-board, panel, or other body whatever, without any permanent injury to such body ground or surface, for the reception of colors in oil (water or dry pastel) without impairing the texture, quality, durability, or other desirable quality of the body ground or surface rendered so impressible, and give the following as the process used in accomplishing the result.

I take ordinary prepared canvas, mill-board, panel, or other substance for the reception of oil-painting by any composition of oil (or oleaginous substance) and oxide of lead or zinc, Spanish whiting, fuller's-earth, or their equivlents, singly or in combination; and after having removed all irregularities or lumps from the surface, I damp or wet the surface with spirits of wine and wipe clean, after which I treat the surface with a solution of potassium or any good alkali, regulating the strength to the amount of oil in the body ground or surface to be treated—ordinarily one ounce of subcarbonate of soda to one pint of water. As soon as the surface has uniformly changed color, allow the surplus solution to run off. Wash off by pouring over the surface clean water. Let dry, but not by the fire or in the sun, as that would bring out the oil to the surface. When dry, treat the surface again with a solution of the chloride of sodium of the strength ordinarily used and prescribed for paper positives. Decant from the surface the superflous fluid after a minute, and let dry, as before. Remove to a dark room and treat the surface with a solution of the nitrate of silver, its strength being governed by the strength of impression desired—usually eighteen grains of nitrate of silver to one ounce of distilled water. Allow the solution to float upon the surface a few moments to insure uniformity of deposit, and then decant the surplus in the bottle or bath, place a small piece of filtering-paper on the edge of the body, and place that edge down to facilitate the drainage. When dry, place the negative impression (which must previously have been obtained by the use of the camera, either on collodion or albumen, upon glass, or upon paper) upon the body or ground to receive the impression in the position the picture is desired, with the face of the negative to the surface of the body to receive the impression. If the negative impression does not cover the whole surface, then a mat should be used, so as to extend to the edge of the ground on all sides. Expose to the light, and when sufficiently long remove the negative in a dark room lighted with a feeble lamp. Dash over the impression a weak solution of hyposulphate of soda and let stand a few moments, and then wash off with a very dilute acid of only sufficient strength to neutralize the alkalies remaining upon the surface. Usually five or six drops of sulphuric acid to an ounce of water is sufficient.

What I claim as my own invention and discovery, and desire to secure by Letters Patent, is—

The mode of preparing and rendering oil (or oleaginous) bodies, grounds, or surfaces impressible or sensitive to the photographic art by the temporary destruction or chemical change of the oil or oleaginous matter on the immediate surface only by the use of the spirits of wine and alkaline solution, or their equivalents, and after fixing the impression by the use of hyposulphate of soda, the use of dilute acid, by which last application the alkalies are neutralized and the oil restored, with the impression permanent upon the surface, disclaiming everything heretofore known in the production of photographic pictures upon paper or any unoiled body or surface.

JOEL HAYWOOD TATUM.

Attest:

JOHN S. HOLLINGSHEAD,

E. G. HANDY.